US010715035B2

(12) United States Patent
 Li et al.

(10) Patent No.: US 10,715,035 B2
(45) Date of Patent: Jul. 14, 2020

(54) CIRCUITS AND METHODS FOR SLEW RATE CONTROL OF SWITCHED CAPACITOR REGULATORS

(71) Applicant: Lion Semiconductor Inc., San Francisco, CA (US)

(72) Inventors: Thomas Li, Mountain View, CA (US); Zhipeng Li, Fremont, CA (US); Alberto Puggelli, Burlingame, CA (US); Hans Meyvaert, Oakland, CA (US)

(73) Assignee: Lion Semiconductor Inc., San Francisco, CA (US)

( * ) Notice: Subject to any disclaimer, the term of this patent is extended or adjusted under 35 U.S.C. 154(b) by 0 days.

(21) Appl. No.: 15/903,974

(22) Filed: Feb. 23, 2018

(65) Prior Publication Data
 US 2019/0265743 A1    Aug. 29, 2019

(51) Int. Cl.
 *H02M 3/07* (2006.01)
 *G05F 3/16* (2006.01)
 *H02M 1/00* (2006.01)

(52) U.S. Cl.
 CPC ............. *H02M 3/07* (2013.01); *G05F 3/16* (2013.01); *H02M 2001/0029* (2013.01)

(58) Field of Classification Search
 CPC .. H02M 3/07; H02M 2003/072; H02M 3/156; H02M 2001/0029
 USPC ........ 363/59, 60, 225; 307/109, 110; 327/56
 See application file for complete search history.

(56) References Cited

U.S. PATENT DOCUMENTS

| 5,736,890 A * | 4/1998 | Yee .................. H02M 7/217 327/423 |
| 6,476,683 B1 * | 11/2002 | Saito ................ H02M 3/155 315/291 |
| 2006/0119326 A1 * | 6/2006 | Jiang ................. H02M 1/08 323/222 |
| 2007/0146051 A1 * | 6/2007 | Tsen ................. H02M 3/07 327/536 |
| 2007/0296383 A1 * | 12/2007 | Xu ................... H02M 1/14 323/282 |
| 2008/0157843 A1 * | 7/2008 | Young .............. H03K 5/1534 327/261 |
| 2012/0043950 A1 * | 2/2012 | Truong ............. H02M 3/158 323/282 |

(Continued)

OTHER PUBLICATIONS

International Search Report and Written Opinion dated Mar. 15, 2019 in International Patent Application No. PCT/US2019/017950.

*Primary Examiner* — Alex Torres-Rivera
(74) *Attorney, Agent, or Firm* — Byrne Poh LLP

(57) ABSTRACT

Circuits comprising: a first capacitor(C1); a first switch(S1) having a first side coupled to a VIN and a second side coupled to a first side of C1; a second switch(S2) having a first side coupled to the second side of S1; a third switch(S3) having a first side coupled to a second side of S2 and a second side coupled to a second side of C1; a fourth switch(S4) having a first side coupled to a second side of S3 and a second side coupled to a $V_{SUPPLY}$, wherein: in a first state, S1 and S3 are off, and S2 and S4 are on; in a second state, S1 and S3 are on, and S2 and S4 are off; and at least one of a control of S1, a control of S2, a control of S3, and a control of S4 is coupled to a time-varying-slew-rate signal.

11 Claims, 4 Drawing Sheets

(56) References Cited

U.S. PATENT DOCUMENTS

| | | | |
|---|---|---|---|
| 2012/0146716 A1* | 6/2012 | Shi | H03K 17/163 327/540 |
| 2012/0286752 A1* | 11/2012 | Tsukiji | H02M 3/156 323/282 |
| 2015/0244260 A1* | 8/2015 | Xu | G05F 1/561 315/209 R |
| 2016/0352218 A1* | 12/2016 | Stauth | H02M 3/07 |
| 2017/0117795 A1* | 4/2017 | Schrom | H02M 1/14 |
| 2017/0353105 A1* | 12/2017 | Solie | H02M 1/36 |
| 2018/0123453 A1 | 5/2018 | Puggelli et al. | |

\* cited by examiner

100

CIRCUITS AND METHODS FOR SLEW RATE CONTROL OF SWITCHED CAPACITOR REGULATORS

BACKGROUND

Switched capacitor regulators are a well-known class of regulator that can be used to regulate voltage or current. In many existing switched capacitor regulators, a network of switches in the regulators switch the regulators between two states. The output voltage or the output current of such regulators can be regulated by adjusting the frequency at which the regulators switch between states. However, changing the switching frequency can be prohibitive in electronic devices that are sensitive to electromagnetic interference (EMI). For example, mobile phones have strict specifications on EMI because too much EMI can affect call quality and wireless data transfer, and mobile phone engineers often need to adjust the operating frequency of various chips to prevent them from interfering with the key communication signals to ensure call quality does not degrade. To meet the strict EMI specification, the SC regulator might need to operate at a predictable, single switching frequency. In this case, the SC regulator cannot adjust the switching frequency to regulate the output voltage.

Accordingly, new mechanisms for regulating the output of switched capacitor regulators are desirable.

SUMMARY

In accordance with some embodiments, circuits and methods for slew rate control of switched capacitor regulators are provided. More particularly, in some embodiments, circuits for a switched capacitor regulator are provided, the circuits comprising: a first capacitor having a first side and a second side; a first switch having a first side coupled to an input voltage, a second side coupled to the first side of the first capacitor, and a control; a second switch having a first side coupled to the second side of the first switch, a second side, and a control; a third switch having a first side coupled to the second side of the second switch, a second side coupled to the second side of the first capacitor, and a control; a fourth switch having a first side coupled to the second side of the third switch, a second side coupled to a supply voltage, and a control, wherein in a first state: the first switch is off; the second switch is on, the third switch is off, and the fourth switch is on, wherein in a second state: the first switch is on, the second switch is off, the third switch is on, and the fourth switch is off, and wherein at least one of the control of the first switch, the control of the second switch, the control of the third switch, and the control of the fourth switch is coupled to a control signal having a slew rate that varies over time.

Still more particularly, in some of these embodiments, the first switch is a PMOS FET, and the control of the first switch is a gate of the PMOS FET.

Still more particularly, in some of these embodiments, the second switch is an NMOS FET, and the control of the second switch is a gate of the NMOS FET.

Still more particularly, in some of these embodiments, the third switch is a PMOS FET, and the control of the third switch is a gate of the PMOS FET.

Still more particularly, in some of these embodiments, the fourth switch is an NMOS FET, and the control of the fourth switch is a gate of the NMOS FET.

Still more particularly, in some of these embodiments, the supply voltage is ground.

Still more particularly, in some of these embodiments, the circuits further comprise a second capacitor having a first side coupled to the second side of the second capacitor and a second side coupled to the supply voltage.

Still more particularly, in some of these embodiments, the circuits further comprise a variable capacitance having a first side coupled to one of the control of the first switch, the control of the second switch, the control of the third switch, and the control of the fourth switch. Even still more particularly, in some of these embodiments, the variable capacitance is a bank of switched capacitors. Even still more particularly, in some of these embodiments, the variable capacitance is a varactor.

Still more particularly, in some of these embodiments, the circuits further comprise a variable current source having an output; third capacitor having a first side coupled to the supply voltage and having a second side coupled to the output of the variable current source and one of the control of the first switch, the control of the second switch, the control of the third switch, and the control of the fourth switch.

DETAILED DESCRIPTION

In accordance with some embodiments, mechanisms for regulating the output of switched capacitor regulators using variable slew rates on the control signals of power switches are provided.

Figure 1:
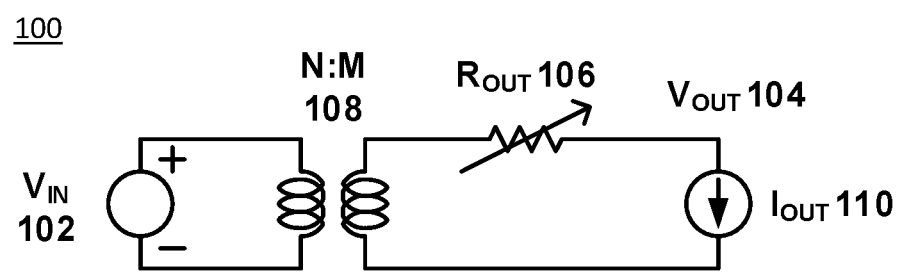
FIG. 1 is an example of a model of an N:M switched capacitor (SC) regulator in accordance with some embodiments.

FIG. 1 illustrates an example 100 of a model of an N:M switched capacitor (SC) regulator in accordance with some embodiments. For example, if N is 2 and M is 1, the SC regulator model 100 describes a 2:1 SC regulator. The input voltage VIN 102 is multiplied by the ratio M/N 108, which is followed by the output resistor $R_{OUT}$ 106. $V_{OUT}=M\times V_{IN}/N-R_{OUT}\times I_{OUT}$. $R_{OUT}$ 106 can be adjusted by changing the switching frequency of the SC regulator, but that can be prohibitive due to EMI reasons in certain applications. $R_{OUT}$ 106 can also be adjusted by changing the effective resistance of power switches. One way to do this is to change the slew rate of the gate driver signals going to the power switches.

Figure 2A:
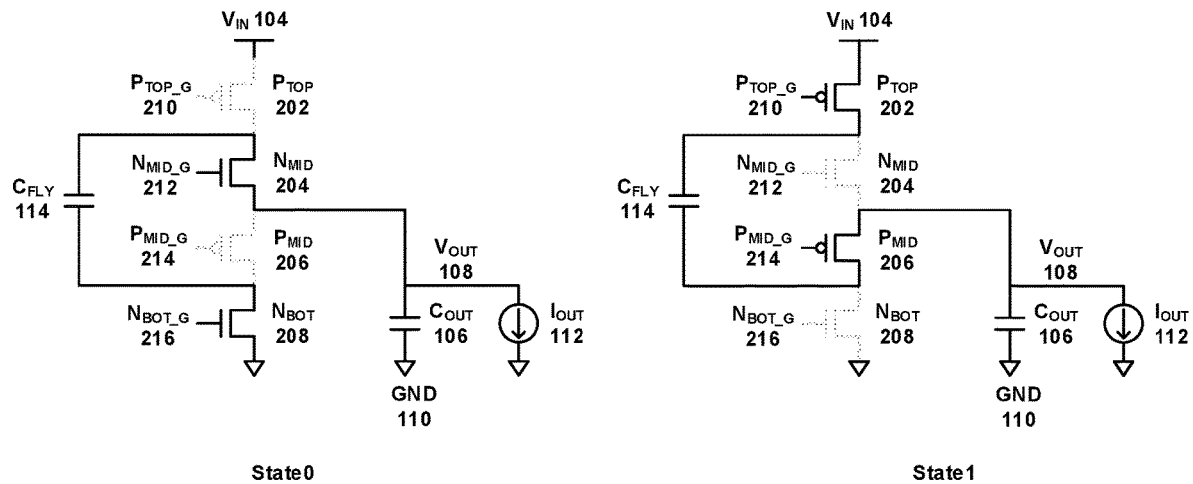
FIG. 2A is an example of a 2:1 SC regulator in accordance with some embodiments.

FIG. 2A illustrates an example of a 2:1 SC regulator 102 in accordance with some embodiments. As shown, regulator 102 includes four power switches $P_{TOP}$ 202, $N_{MID}$ 204, $P_{MID}$ 206, and $N_{BOT}$ 208. Any suitable components can be used to implement these switches in some embodiments. For example, in some embodiments, $P_{TOP}$ 202 and $P_{MID}$ 206 can be PMOS FET power switches, while $N_{MID}$ 204 and $N_{BOT}$ 208 can be NMOS FET power switches.

During operation, these switches can turn on and off to cause the regulator to transition between State 0 and State 1 to regulate $V_{OUT}$ 108 to be close to ½ of $V_{IN}$ 104. These switches can be controlled by four gate signals $P_{TOP\_G}$ 210, $N_{MID\_G}$ 212, $P_{MID\_G}$ 214, and $N_{BOT\_G}$ 216 of the four power switches $P_{TOP}$ 202, $N_{MID}$ 204, $P_{MID}$ 206, and $N_{BOT}$ 208. The gate signals drive a respective gate of $P_{TOP}$ 202, $N_{MID}$ 204, $P_{MID}$ 206, and $N_{BOT}$ 208 to turn them on or off.

As shown in FIG. 2A, in state 0, $P_{TOP}$ 202 and $P_{MID}$ 206 are turned off (as indicated by dashed lines) and $N_{MID}$ 204 and $N_{BOT}$ 208 are turned on. In state 1, $P_{TOP}$ 202 and $P_{MID}$ 206 are turned on, while $N_{MID}$ 204 and $N_{BOT}$ 208 are turned off (as indicated by dashed lines). As illustrated in FIG. 2A, in state 0: a first side of $C_{FLY}$ 114 can be coupled by $N_{MID}$ 204 to a first side of a decoupling capacitor $C_{OUT}$ 106 and an output that outputs $V_{OUT}$ 108; and a second side of $C_{FLY}$ 114 can be coupled by $M_{BOT}$ 208 to ground. In state 1: the first side of $C_{FLY}$ 114 can be coupled by $P_{TOP}$ 202 to $V_{IN}$ 104; and the second side of $C_{FLY}$ 114 can be coupled by $P_{MID}$ 206 to the first side of decoupling capacitor $C_{OUT}$ 106 and the output that outputs $V_{OUT}$ 108. In both state 0 and state 1, a second node of $C_{OUT}$ 106 can be coupled to ground 110 in some embodiments.

Figure 2B:
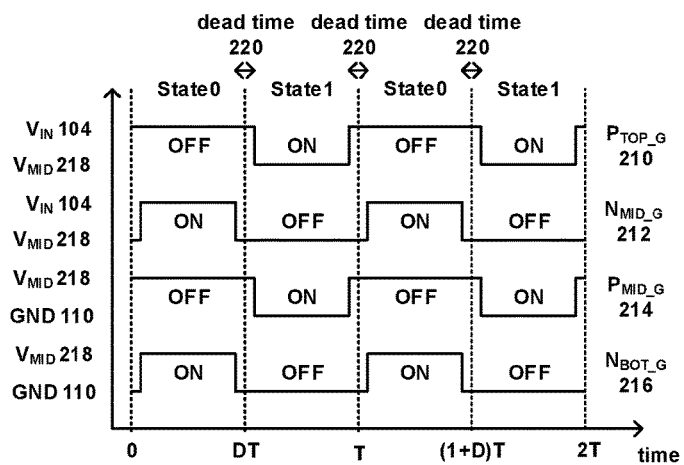
FIG. 2B illustrates examples of waveforms for four gates of the 2:1 SC regulator of FIG. 2A in accordance with some embodiments.

FIG. 2B illustrates example waveforms for the four gates $P_{TOP\_G}$ 210, $N_{MID\_G}$ 212, $P_{MID\_G}$ 214, and $N_{BOT\_G}$ 216 of the four power switches $P_{TOP}$ 202, $N_{MID}$ 204, $P_{MID}$ 206, and $N_{BOT}$ 208, respectively, that can be used in some embodiments. $V_{MID}$ 218 can be connected to $V_{OUT}$ 108 or can be supplied by a separate voltage regulator that generates a voltage close to ½ of the input voltage $V_{IN}$ 104, in some embodiments.

As illustrated in FIG. 2B, $P_{TOP\_G}$ 210 and $P_{MID\_G}$ 214 can share the same signal, and $N_{MID\_G}$ 212 and $N_{BOT\_G}$ 216 can share the same signal, in some embodiments. In some embodiments, there can be a dead time 220 between the turn off time of $N_{MID\_G}$ 212 and turn on time of $P_{TOP\_G}$ 210 to provide enough margin to guarantee that both switches are never turned on at the same time, which can lead to malfunction of the SC regulator. Any suitable duration dead time can be used in some embodiments.

Even when a power switch is on, there is a non-zero on-state resistance due to non-ideal parasitic resistance. The on-state resistance of power switches can be adjusted to adjust ROUT to regulate an SC regulator. The on-state resistance of a MOSFET is roughly inversely proportional to ($V_{GS}-V_{th}$) ($V_{GS}$ is the gate to source voltage of a MOSFET, and $V_{th}$ is the threshold voltage of a MOSFET), so changing the average value of $V_{GS}$ during on-state of the switch is one way to change on-state resistance.

Figure 3A:
FIGS. 3A-3C illustrate examples of gate drive waveforms with different slew rates in accordance with some embodiments.
Figure 3B:
Figure 3C:

This can be done by adjusting the slew rate of gate drive signals. FIGS. 3A-3C illustrate examples of gate drive waveforms with different slew rates that can be as gate drive signals. By using different waveforms, one can control the on-state resistance. FIG. 3A has the highest effective $V_{GS}$, or highest average value of $V_{GS}$ during on-state, which leads to lowest on-state resistance on NBOT 208. FIG. 3B has lower effective $V_{GS}$ and FIG. 3C has the lowest effective $V_{GS}$. Decreasing slew rate on $N_{BOT\_G}$ 216 can lead to lower effective $V_{GS}$ and lower $R_{OUT}$ in some embodiments. This can be applied to switches other than $N_{BOT}$ 208 as well in some embodiments.

Figure 3D:
FIG. 3D illustrates an example of a way to adjust the effective VGS by adjusting the supply voltage of the drivers that generate the gate driver signals in accordance with some embodiments.

As illustrated in FIG. 3D, in some embodiments, another way to adjust the effective $V_{GS}$ can be to adjust the supply voltage of the drivers that generate the gate driver signals (e.g., $N_{BOT\_G}$ 216). In FIG. 3D, $N_{BOT\_G}$ 216 switches between GND 110 and $V_{LOW}$ 318, which is a variable voltage level that is lower voltage than $V_{MID}$ 218. The drawback of this method is it requires an additional voltage regulator to generate the variable voltage $V_{LOW}$ 318. $V_{LOW}$ 318 can be any value between GND 110 and $V_{MID}$ 218. The lower the $V_{LOW}$ 318 voltage, the higher the on-state resistance of $N_{BOT}$ 208. By adjusting the on-state resistance of $N_{BOT}$ 208, the regulator can regulate the output voltage or output current.

Figure 4A:
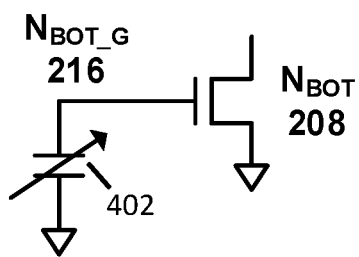
FIG. 4A is an example of first circuit for changing slew rate in accordance with some embodiments.
Figure 4B:
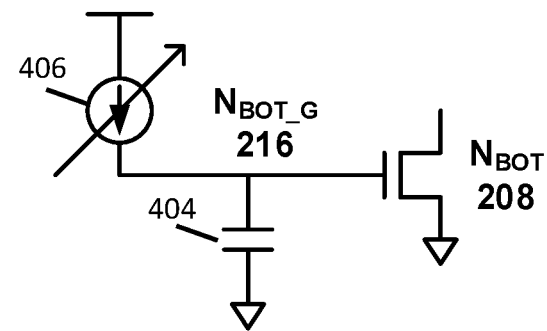
FIG. 4B is an example of a second circuit for changing slew rate in accordance with some embodiments.

In contrast, changing slew rate can be done with very simple circuits. Two examples of circuits that can be used to change slew rate in accordance with some embodiments are illustrated in FIGS. 4A-4B. As illustrated in FIG. 4A, there can be an adjustable capacitance 402, which can be an array of capacitors that are connected or disconnected, or a varactor, on the gate of $N_{BOT}$ 208. More capacitance results in lower slew rate of $N_{BOT\_G}$ 216 and lower effective $V_{GS}$ during on-state of $N_{BOT}$ 208. As illustrated in FIG. 4B, another example is to have a variable current source 406 (which can be implemented in any suitable manner, such as, e.g., a MOSFET with adjustable gate voltage) providing charge to a capacitor 404 connected to the gate of $N_{BOT}$ 208. As the current increases, the slew rate on $N_{BOT\_G}$ 216 increases. Both variable current and variable capacitance can be used in some embodiments to allow for a wide range of slew rate on $N_{BOT\_G}$ 216.

Similar circuits can be applied to other power switches including $P_{TOP}$ 202, $N_{MID}$ 204, and $P_{MID}$ 206.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for a switched capacitor regulator, comprising:
a first capacitor having a first side and a second side;
a first switch having a first side coupled to an input voltage, a second side coupled to the first side of the first capacitor, and a control;
a second switch having a first side coupled to the second side of the first switch, a second side, and a control;
a third switch having a first side coupled to the second side of the second switch, a second side coupled to the second side of the first capacitor, and a control;
a fourth switch having a first side coupled to the second side of the third switch, a second side coupled to a supply voltage, and a control,
wherein in a first state: the first switch is off; the second switch is on, the third switch is off, and the fourth switch is on,
wherein in a second state: the first switch is on, the second switch is off, the third switch is on, and the fourth switch is off,
wherein at least one of the control of the first switch, the control of the second switch, the control of the third switch, and the control of the fourth switch is coupled to a first control signal that is controlled to repeatedly transition between a first low state having a first low voltage level and a first high state having a first high voltage level with a first constant predetermined frequency, wherein the first control signal is controlled to have a first slew rate during a first transition between the first low state to the first high state that is different from a second slew rate during a second transition between the first low state to the first high state, wherein at least another of the control of the first switch, the control of the second switch, the control of the third switch, and the control of the fourth switch is coupled to a second control signal that is controlled to repeatedly transition between a second low state having a second low voltage level and a second high state having a second high voltage level with a second constant predetermined frequency, wherein the second control signal is controlled to have a third slew rate during a first transition between the second low state to the second high state that is different from a fourth slew rate during a second transition between the second low state to the second high state, wherein the first low voltage level is different from the second low voltage level, and the first high voltage level is different from the second high voltage level, and wherein the first slew rate, the second slew rate, the third slew rate, and the fourth slew rate are used to regulate a voltage at the second side of the second switch.

2. The circuit of claim 1, wherein the first switch is a PMOS FET, and the control of the first switch is a gate of the PMOS FET.

3. The circuit of claim 2, wherein the second switch is an NMOS FET, and the control of the second switch is a gate of the NMOS FET.

4. The circuit of claim 2, wherein the third switch is a PMOS FET, and the control of the third switch is a gate of the PMOS FET.

5. The circuit of claim 4, wherein the fourth switch is an NMOS FET, and the control of the fourth switch is a gate of the NMOS FET.

6. The circuit of claim 1, wherein the supply voltage is ground.

7. The circuit of claim 1, further comprising a second capacitor having a first side coupled to the second side of the second switch and a second side coupled to the supply voltage.

8. The circuit of claim 1, further comprising a variable capacitance having a first side coupled to one of the control of the first switch, the control of the second switch, the control of the third switch, and the control of the fourth switch.

9. The circuit of claim 8, wherein the variable capacitance is a bank of switched capacitors.

10. The circuit of claim 8, wherein the variable capacitance is a varactor.

11. The circuit of claim 1, further comprising:
a variable current source having an output; and
a third capacitor having a first side coupled to the supply voltage and having a second side coupled to the output of the variable current source and one of the control of the first switch, the control of the second switch, the control of the third switch, and the control of the fourth switch.

* * * * *

UNITED STATES PATENT AND TRADEMARK OFFICE
CERTIFICATE OF CORRECTION

PATENT NO. : 10,715,035 B2
APPLICATION NO. : 15/903974
DATED : July 14, 2020
INVENTOR(S) : Thomas Li et al.

It is certified that error appears in the above-identified patent and that said Letters Patent is hereby corrected as shown below:

In the Claims

Column 6, Line 1, Claim 4 "The circuit of claim 2," should be --The circuit of claim 3,--.

Signed and Sealed this
Twenty-ninth Day of August, 2023

Katherine Kelly Vidal
*Director of the United States Patent and Trademark Office*